United States Patent
Richards

(10) Patent No.: US 10,421,360 B2
(45) Date of Patent: Sep. 24, 2019

(54) TRACTION CONTROL CONSIDERING WHEEL SLIP, PITCH AND HEAVE

(71) Applicant: JAGUAR LAND ROVER LIMITED, Whitley, Coventry, Warwickshire (GB)

(72) Inventor: Karl Richards, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 122 days.

(21) Appl. No.: 15/519,789

(22) PCT Filed: Oct. 2, 2015

(86) PCT No.: PCT/EP2015/072816
§ 371 (c)(1),
(2) Date: Apr. 17, 2017

(87) PCT Pub. No.: WO2016/058843
PCT Pub. Date: Apr. 21, 2016

(65) Prior Publication Data
US 2017/0246955 A1    Aug. 31, 2017

(30) Foreign Application Priority Data

Oct. 17, 2014   (GB) .................................... 1418399.0

(51) Int. Cl.
*B60K 28/16*        (2006.01)
*B60W 40/13*       (2012.01)
(Continued)

(52) U.S. Cl.
CPC ............... *B60K 28/16* (2013.01); *B60T 8/86* (2013.01); *B60W 10/06* (2013.01);
(Continued)

(58) Field of Classification Search
None
See application file for complete search history.

(56) References Cited

U.S. PATENT DOCUMENTS 4,976,330 A      12/1990  Matsumoto
2003/0200016 A1*  10/2003  Spillane ............. B60G 17/0195
                                                701/36
(Continued)

FOREIGN PATENT DOCUMENTS

CN       103043056 A      4/2013
CN       104080671 A     10/2014
(Continued)

OTHER PUBLICATIONS

Combined Search and Examination Report for application No. GB1418399, dated Mar. 26, 2015, 10 pages.
(Continued)

*Primary Examiner* — Rami Khatib
(74) *Attorney, Agent, or Firm* — Reising Ethington P.C.

(57) ABSTRACT

A traction control system for a motor vehicle includes a controller configured to initiate a traction control intervention at one or more vehicle wheels. The controller is configured to inhibit the traction control intervention in dependence on a reduced wheel load condition in said one or more wheels. The reduced wheel load condition is identified based on at least one of a signal indicative of vehicle pitch and a signal indicative of vehicle heave.

17 Claims, 3 Drawing Sheets

(51) Int. Cl.
  *B60W 10/06* (2006.01)
  *B60W 10/184* (2012.01)
  *B60W 30/02* (2012.01)
  *B60T 8/86* (2006.01)
  *B60W 50/00* (2006.01)
  *B60T 8/48* (2006.01)

(52) U.S. Cl.
  CPC .......... *B60W 10/184* (2013.01); *B60W 30/02* (2013.01); *B60W 40/13* (2013.01); *B60T 8/48* (2013.01); *B60W 2040/1307* (2013.01); *B60W 2050/0075* (2013.01); *B60W 2050/0089* (2013.01); *B60W 2520/10* (2013.01); *B60W 2520/12* (2013.01); *B60W 2520/14* (2013.01); *B60W 2520/16* (2013.01); *B60W 2520/18* (2013.01); *B60W 2520/26* (2013.01); *B60W 2710/0666* (2013.01); *B60W 2710/18* (2013.01); *B60W 2720/30* (2013.01)

(56) References Cited

U.S. PATENT DOCUMENTS

| | | | |
|---|---|---|---|
| 2006/0261937 A1 | 11/2006 | Lu et al. | |
| 2007/0106442 A1* | 5/2007 | Lu | B60T 8/172 |
| | | | 701/38 |
| 2010/0036557 A1* | 2/2010 | Lu | B60T 8/172 |
| | | | 701/38 |
| 2011/0166744 A1 | 7/2011 | Lu et al. | |
| 2012/0065825 A1 | 3/2012 | Nicoson | |

FOREIGN PATENT DOCUMENTS

| | | | | |
|---|---|---|---|---|
| DE | 10050421 | A1 | 5/2002 | |
| DE | 102013013381 | A1 | 2/2014 | |
| EP | 0321894 | A2 * | 6/1989 | ............ B60K 28/14 |
| EP | 1355209 | A1 | 10/2003 | |
| GB | 2434127 | A | 7/2007 | |
| GB | 2441420 | A | 3/2008 | |
| GB | 2441423 | A | 3/2008 | |
| WO | WO2008092003 | A2 | 7/2008 | |

OTHER PUBLICATIONS

International Search Report for International application No. PCT/EP2015/072816, dated Apr. 5, 2016, 9 pages.

Written Opinion for International application No. PCT/EP2015/072816, dated Apr. 5, 2016, 7 pages.

Chinese Office Action corresponding to Chinese application No. 201580062478, dated Nov. 5, 2018, 11 pages.

* cited by examiner

TRACTION CONTROL CONSIDERING WHEEL SLIP, PITCH AND HEAVE

TECHNICAL FIELD

This disclosure relates to traction control. In particular, though not exclusively, this disclosure relates to modifying traction control. Aspects of the invention relate to traction control systems for motor vehicles, vehicles comprising such systems, methods of controlling traction, and to related electronic controllers, software and processors.

BACKGROUND

Traction control systems are well known in the art of motor vehicles for enhancing wheel grip. Such systems are based on the appreciation that in low-traction situations, for example on ice, undesirable or excessive wheel spin may occur. Traction control systems may be of particular importance where an open differential is employed.

Traction control systems initiate traction control interventions at one or more vehicle wheels in dependence on wheelslip. Wheelslip is generally monitored continuously by comparing signals from wheel speed sensors with a vehicle reference speed. Traction control systems can apply brake pressure to a slipping wheel, for example with the aim of transferring torque to other wheels and/or increasing torque applied to other wheels. Additionally or alternatively, if a wheel is slipping, the traction control system may reduce engine torque to help the wheel regain traction.

A traction control system may form part of, or co-operate with, an electronic stability control (ESC) system for maintaining steering control.

While conventional traction control interventions are helpful in most situations, there are certain reduced wheel load scenarios in which they are not.

In one scenario, the load on a vehicle wheel can be reduced when travelling over speed bumps, potholes, or general road undulations at high speed. Indeed one or more wheels of a motor vehicle may become airborne as a result of such terrain. In this scenario, conventional traction control interventions may take unnecessary measures and cause annoyance to the driver, and this may, in extreme cases, lead to a reduction in stability. In particular, if a wheel spins faster as a result of it being in the air and the vehicle is travelling at a high speed, braking the wheel with a traction control intervention can cause it to lock or drop below the vehicle reference speed. When the wheel then lands it will skid undesirably while it is accelerated to the vehicle speed once more. Furthermore, particularly if wheelslip due to the wheel being airborne is significant, a traction control engine torque reduction may be triggered. This may cause an annoyance to the driver and may impede vehicle progress.

A different reduced wheel load scenario may occur when a vehicle is travelling across undulating ground in an off-road mode. In such a scenario a traction control intervention to apply brake pressure to a slipping wheel may be undesirably slow, being a reactive intervention that occurs only after torque has already been lost to wheelslip.

It is an object of the invention to provide an improved traction control system which solves or mitigates at least one problem associated with the prior art.

SUMMARY OF THE INVENTION

Aspects of the invention provide a traction control system for a motor vehicle, the traction control system comprising an electronic controller configured to initiate a traction control intervention at one or more vehicle wheels, wherein the controller is configured to determine or modify the traction control intervention in dependence on at least one of vehicle pitch data and vehicle heave data.

It has been found that vehicle pitch data and vehicle heave data can be used to estimate wheel load in vehicle wheels. This in turn allows reduced wheel load conditions to be identified based on at least one of vehicle pitch data and vehicle heave data. Such identification may then be used as a trigger for modifying a traction control intervention to mitigate undesirable intervention or improve intervention in reduced wheel load scenarios.

According to an aspect of the invention, there is provided a traction control system for a motor vehicle, the traction control system comprising an electronic controller configured to initiate a traction control intervention at one or more vehicle wheels, wherein the electronic controller is configured to modify the traction control intervention in dependence on a reduced wheel load condition in said one or more wheels, the reduced wheel load condition being identified based on at least one of: a signal indicative of vehicle pitch; and a signal indicative of vehicle heave.

It will be appreciated that the reduced wheel load condition is not a directly measured condition but is identified implicitly based on at least one of the signal indicative of vehicle pitch and the signal indicative of vehicle heave.

In an embodiment, the traction control intervention is modified by inhibiting the traction control intervention. Indeed, according to another aspect of the invention, there is provided a traction control system for a motor vehicle, the traction control system comprising an electronic controller configured to initiate a traction control intervention at one or more vehicle wheels, wherein the electronic controller is configured to inhibit the traction control intervention in dependence on a reduced wheel load condition in said one or more wheels, the reduced wheel load condition being identified based on at least one of: a signal indicative of vehicle pitch; and a signal indicative of vehicle heave.

Inhibition of the traction control intervention may be useful, for example, in scenarios involving a reduced wheel load when a vehicle drives over speed bumps, potholes, or general road undulations at high speed.

In an embodiment, the electronic controller is configured to inhibit the traction control intervention such that the severity of the traction control intervention is reduced based on the reduced wheel load condition. For example, the braking force applied to said one or more wheels by the intervention may be reduced and/or the engine torque driving said one or more wheels may be reduced less by the intervention.

In an embodiment, the electronic controller is configured to inhibit the traction control intervention such that the traction control intervention is eliminated based on the reduced wheel load condition. For example, no braking force may be applied to said one or more wheels by the intervention and/or the engine torque driving said one or more wheels may not be reduced by the intervention. The inhibited intervention may thus amount to zero traction control intervention.

In an embodiment, the electronic controller is configured to scale or customize inhibition of the traction control intervention in dependence on the identified reduced wheel load condition. For example, the braking force applied to said one or more wheels by the intervention may be reduced when a first reduced wheel load condition is identified, and no braking force may be applied to said one or more wheels by the intervention when a second reduced wheel load condition is identified. Suitably, the scale of the inhibition may be inversely proportional to an identified wheel load. Optionally, the electronic controller may be configured to scale the inhibition stepwise. Alternatively, the electronic controller may be configured to scale the inhibition linearly.

In an embodiment, the electronic controller is configured to omit inhibition of the traction control intervention in dependence on an inhibition override factor. The inhibition override factor may, for example comprise a vehicle mode, in particular an off-road mode. Inhibition of the traction control intervention may not be desirable off-road in the interest of maintaining maximum traction.

Advantageously, the traction control system may comprise a plurality of modes including an on-road mode and an off-road mode. In an embodiment, the electronic controller is configured to inhibit the traction control intervention in an on-road mode of the system but not to inhibit the traction control intervention in an off-road mode. The electronic controller may thus be configured to inhibit the traction control intervention in an on-road mode of the system only.

In an embodiment, the traction control intervention is modified by enhancing the traction control intervention. Indeed, according to yet another aspect of the invention there is provided a traction control system for a motor vehicle, the traction control system comprising an electronic controller configured to initiate a traction control intervention at one or more vehicle wheels, wherein the electronic controller is configured to enhance the traction control intervention in dependence on a reduced wheel load condition in said one or more wheels, the reduced wheel load condition being identified based on at least one of: a signal indicative of vehicle pitch; and a signal indicative of vehicle heave.

Enhancement of the traction control intervention may be useful, for example, in off-road scenarios involving a reduced wheel load.

Suitably the traction control intervention may be enhanced by increasing the braking force applied to said one or more wheels by the intervention and/or by reducing a delay before the braking force is applied. Other optional features of this aspect of the invention may be as hereinabove described, save that traction control intervention is enhanced instead of inhibited, i.e. the severity of the traction control intervention is increased rather than reduced, and that the traction control intervention comprises (or consists of) braking of said one or more wheels.

In an embodiment, the electronic controller is configured to omit enhancement of the traction control intervention in dependence on an enhancement override factor. The enhancement override factor may, for example comprise a vehicle mode, in particular an on-road mode. Enhancement of the traction control intervention may not be desirable on-road in the interest of vehicle stability.

The reduced wheel load condition may in principle be any condition in which the weight borne by the one or more wheels is reduced. Advantageously, the weight borne by the one or more wheels may be reduced at least 50% compared to stationary load. In an embodiment, the reduced wheel load condition is an airborne wheel condition, i.e. a condition in which the at least one wheel has lost contact with the ground. In an embodiment, only airborne wheel conditions are taken as said reduced wheel load condition, and no modification of the intervention is made unless there is an airborne wheel condition.

Typically the electronic controller initiates a traction control intervention by sending an intervention command, for example to a brake system or a powertrain of the vehicle. Modification of the traction control intervention may involve suitably modifying such an intervention command.

Any controller or controllers described herein may suitably comprise an electronic control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A first controller may be implemented in software run on one or more processors. One or more other controllers may be implemented in software run on one or more processors, optionally the same one or more processors as the first controller. Other suitable arrangements may also be used.

The electronic controller is configured to modify the traction control intervention in dependence on the reduced wheel load condition, i.e. to trigger modification of the traction control intervention when the reduced wheel load condition is identified.

The traction control intervention may comprise braking said one or more wheels. Additionally or alternatively, the traction control intervention may comprise a reduction in an engine torque driving said one or more wheels.

Suitably, the electronic controller may be configured to initiate or determine the traction control intervention in dependence on a wheelslip condition. In an embodiment, the electronic controller may be configured to determine a wheelslip condition from wheel speed and vehicle reference speed data. The electronic controller may, for example, initiate or determine the traction control intervention if a wheelslip threshold is exceeded.

In an embodiment, the electronic controller is configured to determine, and optionally initiate, an inhibited traction control intervention based on a wheelslip condition and a reduced wheel load condition identified based on at least one of the signal indicative of vehicle pitch and the signal indicative of vehicle heave. The traction control intervention may be entirely inhibited in dependence on the reduced wheel load condition. Thus, in an embodiment, the inhibited traction control intervention may amount to zero intervention.

In an embodiment, the electronic controller is configured to determine, and optionally initiate, an enhanced traction control intervention based on a wheelslip condition and a reduced wheel load condition identified based on at least one of the signal indicative of vehicle pitch and the signal indicative of vehicle heave. The enhanced traction control intervention may suitably comprise (or consist of) braking of said one or more wheels.

The reduced wheel load condition is identified based on at least one of a signal indicative of vehicle pitch and a signal indicative of vehicle heave. The signal indicative of vehicle pitch may suitably comprise or consist of vehicle pitch data. The signal indicative of vehicle heave may suitably comprise or consist of vehicle heave data.

Optionally, the reduced wheel load condition may be identified based on one or more additional signals, suitably comprising additional data.

The vehicle pitch data relate to rotational vehicle movement about a transverse axis. The term "pitch" is thus used herein to refer to rotational movement about a transverse axis.

In an embodiment, the vehicle pitch data comprise a pitch profile over time associated with the reduced wheel load condition. For example, the pitch of a vehicle may have a characteristic pitch profile or pattern associated with one or more wheels of the vehicle becoming airborne, such as after the vehicle travels over a speed bump. In an embodiment, the pitch profile comprises a pitch spike or trough.

In an embodiment, the pitch data comprise a pitch sensor signal. The pitch sensor signal may in particular be an inertial pitch sensor signal. In an embodiment, the pitch data comprise a rotation rate signal, for example from a gyroscopic pitch sensor.

The vehicle heave data relate to translational vehicle movement along a vertical axis. The term "heave" is thus used herein to refer to translational movement along a vertical axis.

The vehicle heave data may be derived in any suitable manner and may be of any suitable type. In an embodiment, the heave data comprise a heave profile over time associated with the reduced wheel load condition. For example, the heave of a vehicle may have a characteristic profile associated with one or more wheels of the vehicle becoming airborne, such as after the vehicle travels over a speed bump. In an embodiment, the heave profile comprises a heave spike or trough.

In an embodiment, the heave data comprise a heave sensor signal. The heave sensor signal may in particular be an inertial heave sensor signal. In an embodiment, the heave data comprise a translation rate signal, for example from a heave accelerometer.

For enhancing the accuracy of identification, the reduced wheel load condition may also be identified based on additional vehicle data. The additional data may for example be selected from one or more of yaw data, roll data, longitudinal acceleration, lateral acceleration, and speed data of the vehicle.

In an embodiment, the additional data comprise an additional data profile over time associated with the reduced wheel load condition. Suitably one or more additional data profiles may be analyzed in combination with a pitch profile or heave profile to identify the reduced wheel load condition.

Suitably the electronic controller may be configured to receive at least one of the pitch data and the heave data, and optionally the additional data, and to identify the reduced wheel load condition based on the received data.

The traction control system may comprise a memory accessible by the electronic controller for storing at least one of the pitch data and the heave data, and optionally the additional data. This facilitates identification based on data profiles over time.

In an embodiment the electronic controller is configured to identify the reduced wheel load condition by comparing the received data with reference data. Suitably, the electronic controller may be configured to compare a profile over time associated with the received data with a reference profile to identify the reduced wheel load condition. Conveniently, the electronic controller may be configured to consult a lookup table comprising a plurality of reference profiles, and to identify the reduced wheel load condition when the profile of received data corresponds to a reference profile associated with the reduced wheel load condition.

Additionally or alternatively, the electronic controller may be configured with an algorithm for identifying the reduced wheel load condition based on the received data.

The electronic controller may of course be configured to initiate a plurality of distinct traction control interventions in a plurality of wheels and to modify each intervention in dependence on a reduced wheel load condition in its associated wheel or wheels.

The traction control systems of the invention may be co-operable with sensing means or sensors for sensing at least one of vehicle pitch data and vehicle heave data, and optionally additional data as hereinabove described.

Optionally, the sensing means may comprise an inertial measurement unit (IMU). Conveniently, the inertial measurement unit may be configured to provide at least one of a rotation rate signal from a gyroscopic sensor representing pitch data, and a translation rate signal from an accelerometer sensor representing heave data. Advantageously, the inertial measurement unit may measure six degrees of freedom, i.e. longitudinal acceleration, lateral acceleration, heave data, pitch data, yaw data, and roll data of the vehicle. Suitable inertial measurement units, based for example on microelectromechanical systems (MEMS) technology are known in the art.

The traction control systems of the invention may be co-operable with a brake system for braking said one or more wheels and/or a powertrain supplying torque to said one or more wheels.

According to a further aspect of the invention, there is provided a vehicle comprising a plurality of wheels, a powertrain, a brake system, sensing means for sensing at least one of vehicle pitch data and vehicle heave data, and a traction control system as described in any aspect or embodiment of the invention, the traction control system being configured for initiating traction control intervention in at least one of the plurality of wheels. The traction control system may be configured to receive information from the sensing means and to send intervention commands to at least one of the brake system and the powertrain.

Aspects of the invention relate to a method for controlling traction at one or more wheels of a motor vehicle, the method comprising modifying or determining a traction control intervention in dependence on at least one of vehicle pitch data and vehicle heave data.

According to yet a further aspect of the invention, there is provided a method of controlling traction at one or more wheels of a motor vehicle, the method comprising: identifying a wheelslip condition in said one or more wheels, identifying a reduced wheel load condition in said one or more wheels based on at least one of vehicle pitch data and vehicle heave data; and determining (and optionally initiating) a modified traction control intervention in dependence on the wheelslip condition and the reduced wheel load condition.

In an embodiment, the method comprises determining an inhibited traction control intervention. Indeed, according to a further aspect of the invention, there is provided a method of controlling traction at one or more wheels of a motor vehicle, the method comprising: identifying a wheelslip condition in said one or more wheels, identifying a reduced wheel load condition in said one or more wheels based on at least one of vehicle pitch data and vehicle heave data; and determining an inhibited traction control intervention in dependence on the wheelslip condition and the reduced wheel load condition.

The traction control intervention may be entirely inhibited in dependence on the reduced wheel load condition. Thus, in an embodiment, the inhibited traction control intervention may amount to zero intervention. Alternatively, the traction control intervention may be partially inhibited in dependence on the reduced wheel load condition. In an embodiment, the inhibited traction control intervention comprises at least one of: braking said one or more wheels; and reducing an engine torque driving said one or more wheels.

In an embodiment, the method may comprise checking that an on-road mode of the vehicle is active before determining the inhibited traction control intervention.

In an embodiment, the modified traction control intervention is an enhanced traction control intervention. Indeed, according to still a further aspect of the invention, there is provided a method of controlling traction at one or more wheels of a motor vehicle, the method comprising: identifying a wheelslip condition in said one or more wheels, identifying a reduced wheel load condition in said one or more wheels based on at least one of vehicle pitch data and vehicle heave data; and determining an enhanced traction control intervention in dependence on the wheelslip condition and the reduced wheel load condition.

Suitably the traction control intervention may be enhanced by increasing the braking force applied to said one or more wheels by the intervention compared to an equivalent intervention not determined in dependence on the reduced wheel load condition. Suitably the traction control intervention may be enhanced by reducing a delay before braking force is applied to said one or more wheels.

In an embodiment, the method may comprise determining that an off-road mode of the vehicle is active before determining the enhanced traction control intervention.

Advantageously, the method may comprise: determining a traction control intervention for said one or more wheels in dependence on the wheelslip condition; and modifying the traction control intervention in dependence on the reduced wheel load condition.

Optionally, the method may comprise sending a signal to a brake system or a powertrain of a vehicle to cause the brake system or a powertrain to perform the modified traction control intervention.

The reduced vehicle load condition, vehicle pitch data, and vehicle heave data may be as hereinabove described in respect of the traction control systems.

For enhancing the accuracy of identification, the reduced wheel load condition may also be identified based on additional data. The additional data may be as hereinabove described in respect of the modification of traction control.

In an embodiment, the method comprises identifying the reduced wheel load condition by comparing at least one of vehicle pitch data and vehicle heave data, and optionally the additional data, with reference data.

In an embodiment, the method may comprise comparing a profile over time associated with the at least one of vehicle pitch data and vehicle heave data, and optionally the additional data, with a reference profile to identify the reduced wheel load condition. Conveniently, the method may comprise consulting a lookup table comprising a plurality of reference profiles to identify a matching reference profile associated with the reduced wheel load condition. Additionally or alternatively, the method may comprise feeding the data to an algorithm to identify the reduced wheel load condition.

The method may of course comprise determining a plurality of distinct modified traction control interventions in a plurality of wheels, and optionally sending a signal to a brake system or a powertrain of a vehicle to cause the brake system or a powertrain to perform the modified traction control interventions.

The methods of the invention may be computer implemented. A further aspect of the invention embraces a carrier medium carrying computer readable code for controlling a vehicle to carry out a method according to any aspect or embodiment of the invention. Yet another aspect of the invention provides a computer program executable on a processor so as to implement a method according to any aspect or embodiment of the invention. Still another aspect of the invention provides a non-transitory computer readable medium loaded with such a computer program. The invention also embraces, from a still further aspect, a processor arranged to implement a method according to any aspect or embodiment of the invention or the computer program.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Optional features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
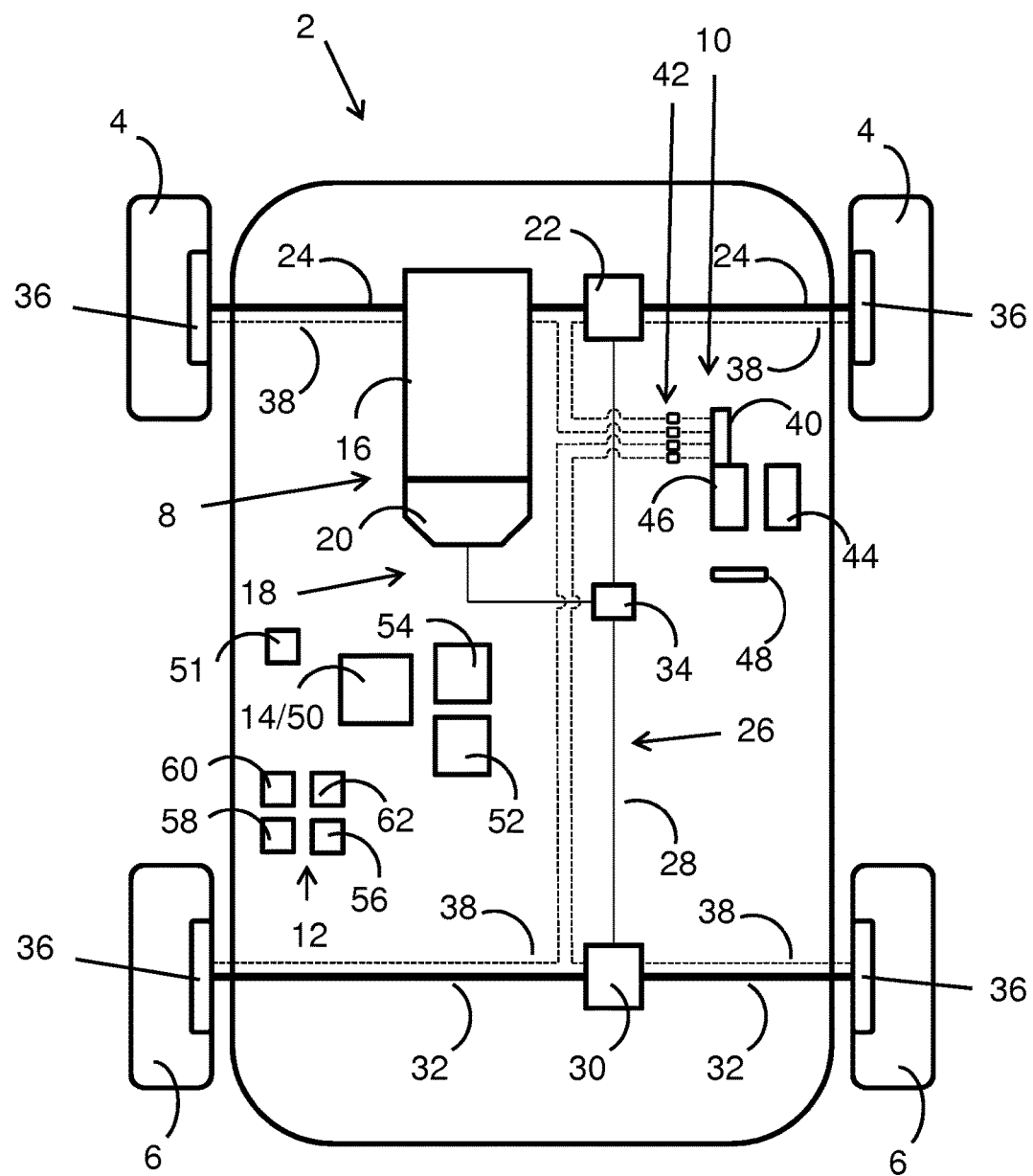
FIG. 1 is a schematic view of a vehicle comprising a traction control system in accordance with an embodiment of the invention.

With reference to FIG. 1, a motor vehicle 2 according to an embodiment of the invention comprises a pair of front wheels 4, a pair of rear wheels 6, a powertrain 8, a brake system 10, vehicle sensors 12, and a traction control system 14.

The powertrain 8 comprises an engine 16 for generating torque and a driveline 18 having a transmission 20 for transmitting the torque to the wheels 4, 6. The driveline 18 is arranged to drive the front wheels 4 by means of a front differential 22 and a pair of front drive shafts 24. The driveline 18 also comprises an auxiliary driveline portion 26 arranged to drive the rear wheels 6 by means of an auxiliary driveshaft or prop-shaft 28, a rear differential 30 and a pair of rear driveshafts 32. Embodiments of the invention are suitable for use with vehicles in which the engine is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the engine 16 is releasably connectable to the auxiliary driveline portion 26 by means of a power transfer unit (PTU) 34, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 34 is operable in a 'high ratio' or a 'low ratio' configuration, in which a gear ratio between an input shaft and an output shaft thereof is selected to be a high or low ratio. The high ratio configuration is suitable for general on-road or 'on-highway' operations in an on-road mode of the vehicle, while the low ratio configuration is more suitable for negotiating certain off-road terrain conditions, e.g. in an off-road mode of the vehicle.

The brake system 10 of the vehicle 2 comprises four hydraulic disc brakes 36, one for each wheel 4, 6 of the vehicle. The disc brakes 36 are individually operable by imparting hydraulic pressure via hydraulic lines 38 connecting each brake to a master cylinder 40. Each hydraulic line 38 is in communication with hydraulic pressure control means 42 for increasing or decreasing hydraulic pressure in the line 38 based on electronic commands. Such hydraulic pressure control means 42 are well known in the art and may, for example comprise pumps and valves.

The vehicle 2 has an accelerator pedal 44 for indicating a demanded torque output of the powertrain 8, a brake pedal 46 for indicating a desired braking effort to be supplied by the brake system 10, and a steering wheel 48 for steering the front wheels 4.

The functionality of the traction control system 14 is performed by a brake controller of the vehicle, for example by an electronic Anti-lock Brake System (ABS) controller 50.

The ABS controller 50 may suitably comprise a control unit or computational device having one or more electronic processors.

The ABS controller 50 provides advanced braking functionality in the vehicle 2 by controlling the brake system 10 and engine 16, via an electronic brake controller 52 and an electronic engine management controller 54. The ABS controller 50 is in communication with the brake and engine management controllers 52, 54, and other controllers and components of the vehicle 2, using a CAN interface or similar. Such communication may be facilitated via any suitable wired or wireless connection, such as, for example, a controller area network (CAN) bus, FlexRay communication bus, a system management bus (SMBus), a proprietary communication link, or through some other arrangement known in the art.

For purposes of this disclosure, and notwithstanding the above, it is to be understood that the controller(s) or electronic control units (ECUs) described herein may each comprise a control unit or computational device having one or more electronic processors. Vehicle 2 and/or a subsystem thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, a set of instructions may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The ABS controller 50 receives information from the vehicle sensors 12. The information may be received by the ABS controller 50 directly, or indirectly via one or more other subsystem controllers associated with the sensors. For example the subsystem controllers may communicate with the sensors 12 and then publish a signal therefrom to the CAN.

To allow the ABS controller 50 to provide a traction control function, the vehicle sensors 12 include wheel speed sensors 56, a vehicle reference speed sensor 58, an engine torque sensor 60, and a six degree of freedom inertial measurement unit (IMU) 62. The vehicle may of course comprise other sensors that are not illustrated. The IMU 62 provides the ABS controller 50 with pitch data, yaw data, roll data, longitudinal acceleration, lateral acceleration and heave data for the vehicle 2. Suitable IMUs are known in the art. One non-limiting example of a suitable IMU is the BMI055 available from Bosch Sensortec.

The ABS controller 50 acts as an electronic controller of the traction control system 14 of the vehicle 2. The ABS controller 50 is able to initiate traction control interventions by virtue of controlling relevant vehicle subsystems, in particular the brake controller 52 and the engine management controller 54. Intervention commands can be sent by the ABS controller 50 to the brake controller 52 and the engine management controller 54 as may be required, which in turn control the powertrain 8 and brake system 10 as commanded.

Figure 2:
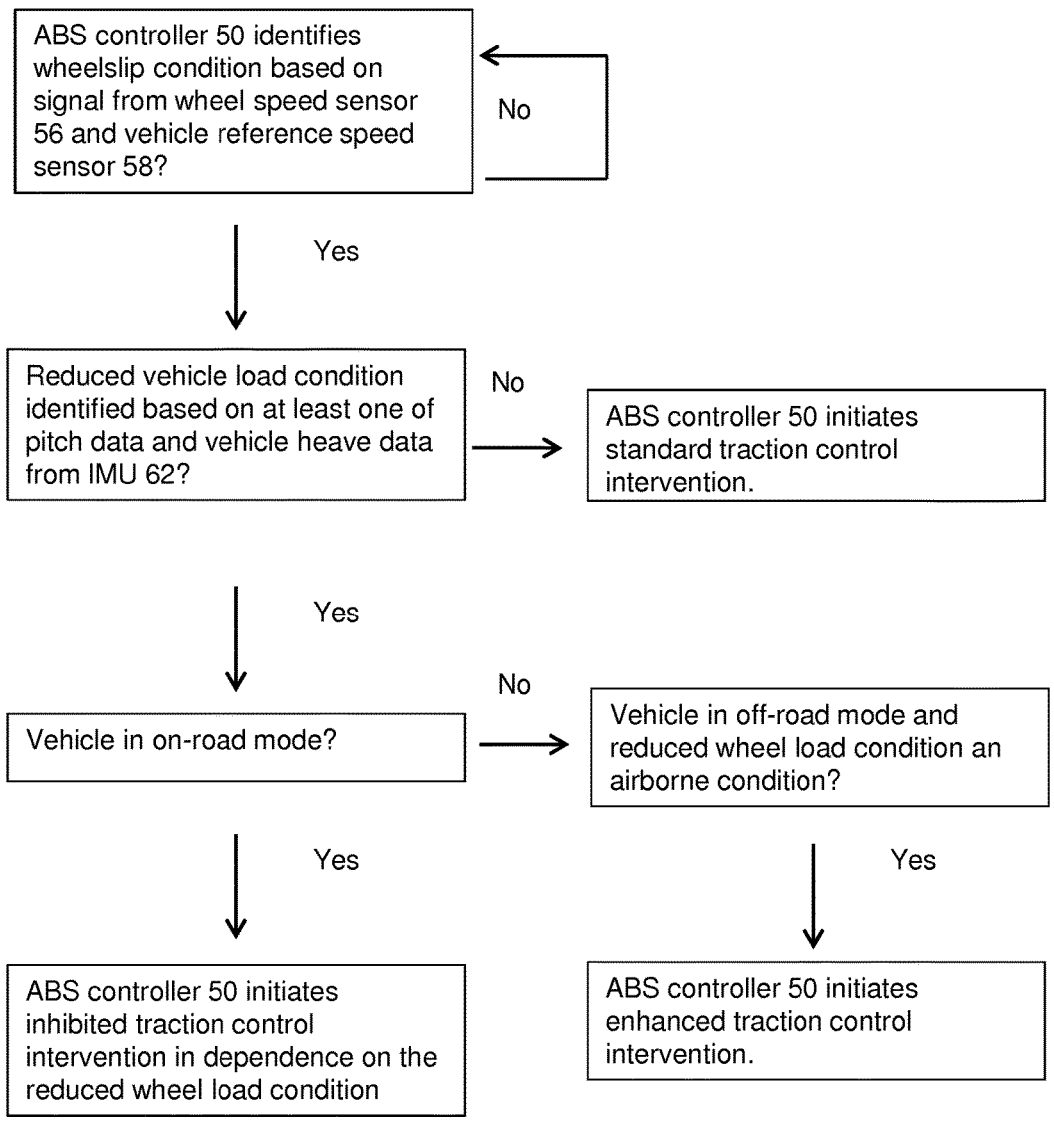
FIG. 2 is a flow diagram illustrating traction control functions carried out in an electronic control unit of the vehicle of FIG. 1.

Referring now to FIG. 2, in one non-limiting operational mode, the ABS controller 50 is configured to identify a wheelslip condition in at least one wheel based on a signal from the wheel speed sensors 56 and vehicle reference speed sensor 58. In particular, the ABS controller 50 accesses wheel speed data from the wheel speed sensors 56 and vehicle reference speed data from the vehicle reference speed sensor 58. If no wheelslip condition is identified, the identification step is repeated as long as the system 14 remains active.

If a wheelslip condition is identified, the ABS controller 50 checks whether a reduced vehicle load condition has been identified based on at least one of pitch data and vehicle heave data obtained from the IMU 62.

The ABS controller 50 is configured to identify reduced wheel load conditions based on at least one of vehicle pitch data and vehicle heave data, comprised in an output of the IMU 62. In particular the ABS controller 50 is configured to store vehicle pitch data and vehicle heave data in a memory 51 to determine pitch profiles and heave profiles over time. The pitch and heave profiles are compared by the ABS controller 50 with a lookup table including a reference profiles mapped to normal wheel load conditions and reduced wheel load conditions. If a compared profile is found by the ABS controller 50 to match a reference profile associated with a reduced wheel load condition then the ABS controller 50 concludes that a reduced wheel load condition has been identified.

Figure 3:
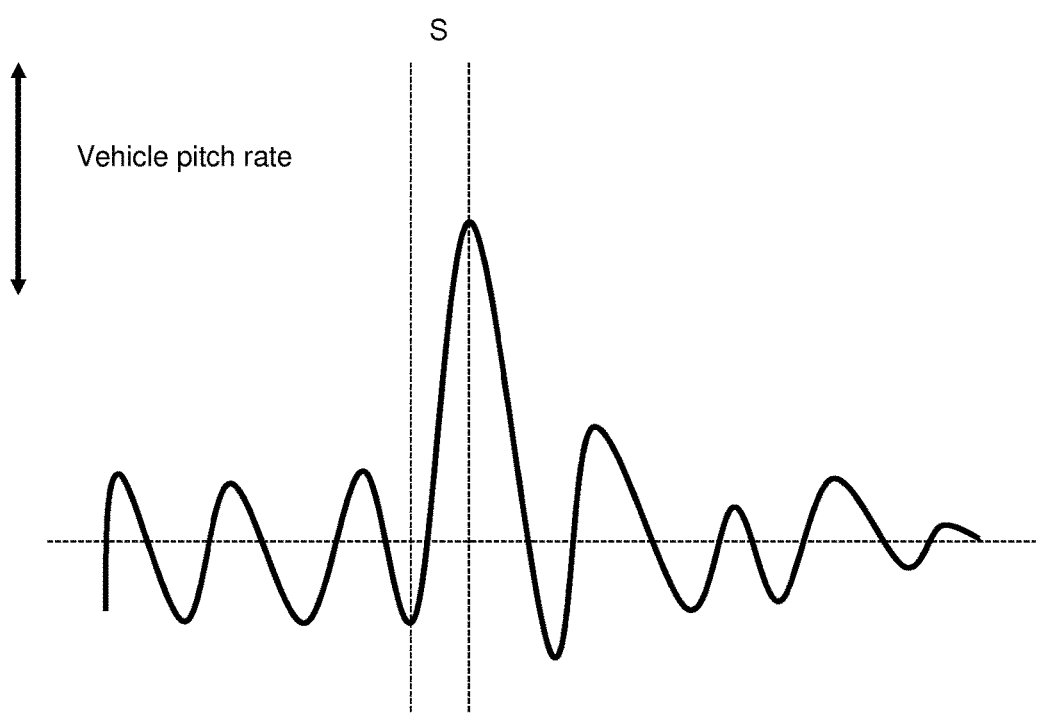
FIG. 3 is an illustration of pitch data obtained while the vehicle of FIG. 1 travelled over a speed bump.

By way of further illustration, an example of pitch data received from the IMU 62 as a vehicle travels over a speed bump at high speed is shown in FIG. 3. The pitch rate of the vehicle is subject to a clearly identifiable spike S in this scenario, representing a pitch profile associated with a reduced load condition for the wheels of the vehicle.

The ABS controller 50 consults the lookup table based on the detected pitch profile and finds a matching reference profile mapped to a reduced wheel load (speed bump) condition. Particular characteristics of the reduced wheel load condition, such as its duration and which wheels are affected, are also mapped. Accordingly, the ABS controller 50 is able to conclude that a particular reduced wheel load condition exists, for example for a particular wheel for a particular duration and with a particular severity.

A similar determination may be made by the ABS controller 50 by using the heave data instead of or in addition to the pitch data. Additional data from the IMU 62 or other sensors may also be used in the determination, to aid accurate identification and differentiation of reduced wheel load conditions.

As an alternative to a lookup table, an algorithm may be used, for example based on pitch or heave gradients. The lookup table or algorithm will vary from vehicle to vehicle and may be created based on calculations and/or obtained by calibration.

Referring again to FIG. 2, if no reduced wheel load condition is identified, then the ABS controller 50 initiates a standard traction control intervention. The intervention may comprise braking one or more wheels 4, 6 and/or a reduction in the torque of the engine. The ABS controller 50 can initiate such interventions by sending commands to the engine controller 54 and brake controller 52 respectively, which in turn act to control the engine 16 or brake system 10 as required.

By virtue of identifying reduced wheel load conditions, the ABS controller 50 is able to avoid unhelpful traction control interventions and/or to enhance the efficiency of interventions.

If a reduced wheel load condition is identified, the ABS controller 50 modifies the traction control intervention in dependence on the reduced wheel load condition.

In the on-road mode, the ABS controller is configured to inhibit any traction control intervention in dependence on the reduced wheel load condition, i.e. to trigger inhibition of the traction control intervention when the reduced wheel load condition is identified:

For reduced wheel load conditions of low severity, the ABS controller 50 is configured to inhibit the traction control intervention such that the severity of the traction control intervention is reduced. For example, the braking force applied by the intervention may be reduced and/or the engine torque may be reduced less by the intervention.

For more severe reduced wheel load conditions, for example those where one or more wheels is airborne, the ABS controller 50 is configured to inhibit the traction control intervention such that the traction control intervention is eliminated. For example, no braking force may be applied by the intervention and/or the engine torque may not be reduced by the intervention.

It will be appreciated that the particular nature or scale of the inhibition(s) may be readily modified as desired.

Referring still to FIG. 2, in the off-road mode, the ABS controller 50 is configured to enhance a braking traction control intervention in dependence on the reduced wheel load condition, i.e. to trigger enhancement of the traction control intervention when the reduced wheel load condition is identified. In particular, on identification of a reduced wheel load condition, the ABS controller 50 is configured to enhance braking force applied by any traction control intervention.

It will be appreciated that many modifications can be made to this embodiment without departing from the scope of the invention as defined in the appended claims.

For example, while the ABS controller 50 has been described as inhibiting traction control intervention in an on-road mode of the vehicle and enhancing traction control intervention in an off-road mode of the vehicle, inhibition or enhancement can also be implemented independently. For example, the ABS controller 50 could be configured to inhibit traction control intervention in an on-road mode and to initiate a standard traction control intervention in an off-road mode.

The invention claimed is:

1. A traction control system for a motor vehicle, the traction control system comprising an electronic controller configured to identify a wheelslip condition and initiate a traction control intervention at one or more vehicle wheels in dependence on the wheelslip condition, wherein the electronic controller is configured to modify the traction control intervention at said one or more wheels in dependence on a reduced wheel load condition in said one or more wheels, the reduced wheel load condition being identified based on at least one of: a signal indicative of vehicle pitch; or a signal indicative of vehicle heave, wherein one or more of the signal indicative of vehicle pitch comprises vehicle pitch data and the signal indicative of vehicle heave comprises vehicle heave data, and wherein one or more of the vehicle pitch data comprise a pitch profile over time associated with the reduced wheel load condition, the pitch data comprise an inertial pitch sensor signal, the heave data comprise a heave profile over time associated with the reduced wheel load condition, and the heave data comprise an inertial heave sensor signal, and further wherein the controller is configured to modify the traction control intervention by reducing or eliminating the traction control intervention at said one or more wheels.

2. The traction control system of claim 1, wherein the controller is configured to reduce the traction control intervention such that a severity of the traction control intervention is reduced based on the reduced wheel load condition.

3. The traction control system of claim 1, wherein the controller is configured to eliminate the traction control intervention such that the traction control intervention is eliminated based on the reduced wheel load condition.

4. The traction control system of claim 1, wherein the controller is configured to scale or customize the reducing or eliminating of the traction control intervention in dependence on the identified reduced wheel load condition.

5. The traction control system of claim 1, wherein the controller is configured to carry out at least one of: omit the reducing or eliminating of the traction control intervention in an off-road mode of the vehicle; and modify the traction control intervention by enhancing the traction control intervention in an off-road mode of the vehicle.

6. The traction control system of claim 1, wherein the reduced wheel load condition is an airborne wheel condition.

7. The traction control system of claim 1, wherein the traction control intervention comprises one or more of: braking said one or more wheels; and a reduction in an engine torque driving said one or more wheels.

8. The traction control system of claim 1, wherein the reduced wheel load condition is also identified based on additional data selected from one or more of yaw data, roll data, longitudinal acceleration, lateral acceleration, and speed data of the vehicle.

9. The traction control system of claim 1, wherein the controller is configured to initiate a plurality of distinct traction control interventions in a plurality of wheels and to modify each intervention in dependence on an identified wheel load condition in the associated wheel or wheels.

10. A vehicle comprising a plurality of wheels, a powertrain, a brake system, sensing means for sensing at least one of vehicle pitch data and vehicle heave data, and a traction control system according to claim 1, the traction control system being configured to initiate traction control intervention in at least one of the plurality of wheels.

11. A traction control system for a motor vehicle, the traction control system comprising an electronic controller configured to identify a wheelslip condition and initiate a traction control intervention at one or more vehicle wheels in dependence on the wheelslip condition, wherein the electronic controller is configured to modify the traction control intervention at said one or more wheels in dependence on a reduced wheel load condition in said one or more wheels, the reduced wheel load condition being identified based on at least one of: a signal indicative of vehicle pitch; or a signal indicative of vehicle heave, wherein one or more of the signal indicative of vehicle pitch comprises vehicle pitch data and the signal indicative of vehicle heave comprises vehicle heave data, and the controller is configured to one or more of: receive at least one of the pitch data and the heave data and to identify the reduced wheel load condition based on the received data; identify the reduced wheel load condition by comparing the received data with reference data; and compare a profile over time associated with the received data with a reference profile to identify the reduced wheel load condition, and further wherein the controller is configured to modify the traction control intervention by reducing or eliminating the traction control intervention at said one or more wheels.

12. A method of controlling traction at one or more wheels of a motor vehicle, the method comprising: identifying a wheelslip condition in said one or more wheels, identifying a reduced wheel load condition in said one or more wheels based on at least one of vehicle pitch data or vehicle heave data, wherein one or more of the vehicle pitch data comprise a pitch profile over time associated with the reduced wheel load condition, the pitch data comprise an inertial pitch sensor signal, the heave data comprise a heave profile over time associated with the reduced wheel load condition, and the heave data comprise an inertial heave sensor signal; and determining a modified traction control intervention at said one or more wheels in dependence on the wheelslip condition and the reduced wheel load condition, wherein determining a modified traction control intervention comprises reducing or eliminating the traction control intervention at said one or more wheels.

13. The method of claim 12, wherein the reduced traction control intervention comprises at least one of braking said one or more wheels and a reduction in an engine torque driving said one or more wheels.

14. The method of claim 12, comprising identifying the reduced wheel load condition based on additional data selected from one or more of yaw data, roll data, longitudinal acceleration, lateral acceleration, and speed data of the vehicle.

15. The method of claim 12, wherein the reduced wheel load condition is an airborne wheel condition.

16. A non-transitory carrier medium carrying computer readable code for controlling a vehicle to carry out the method according to claim 12.

17. An electronic controller for a vehicle having a storage medium associated therewith storing instructions that when executed by the controller cause the determination of a modified traction control intervention in accordance with a method comprising: identifying a wheelslip condition in one or more wheels, identifying a reduced wheel load condition in said one or more wheels based on at least one of vehicle pitch data or vehicle heave data, wherein one or more of the vehicle pitch data comprise a pitch profile over time associated with the reduced wheel load condition, the pitch data comprise an inertial pitch sensor signal, the heave data comprise a heave profile over time associated with the reduced wheel load condition, and the heave data comprise an inertial heave sensor signal; and determining a modified traction control intervention at said one or more wheels in dependence on the wheelslip condition and the reduced wheel load condition, wherein the controller is configured to modify the traction control intervention by reducing or eliminating the traction control intervention at said one or more wheels.

* * * * *